Sept. 28, 1954    I. V. K. HOTT ET AL    2,690,235
ADJUSTABLE AXLE SUPPORT FOR AUTOMOBILE LIFTS
Filed March 20, 1950    3 Sheets-Sheet 1
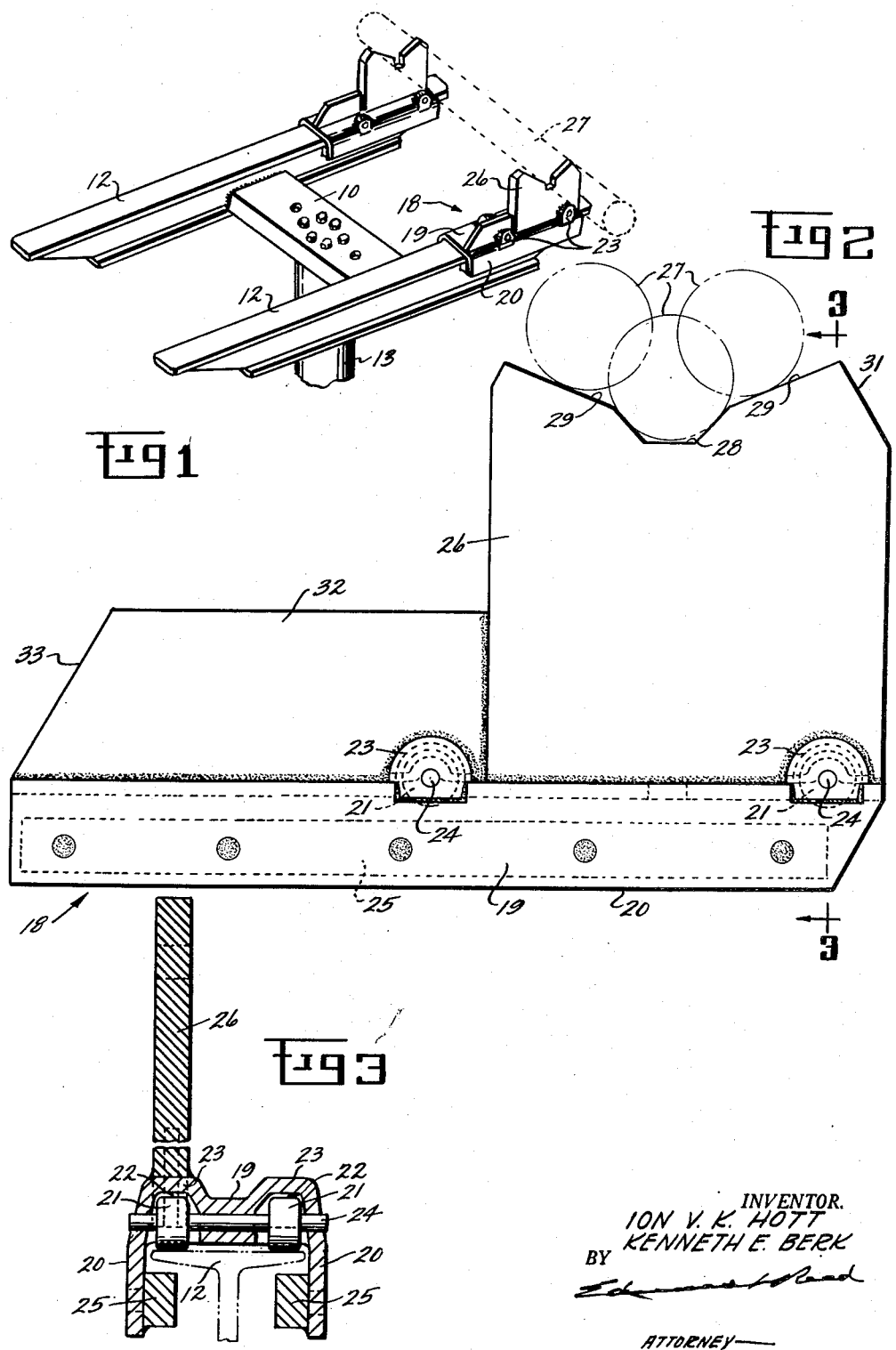
INVENTOR.
ION V. K. HOTT
KENNETH E. BERK
BY
ATTORNEY

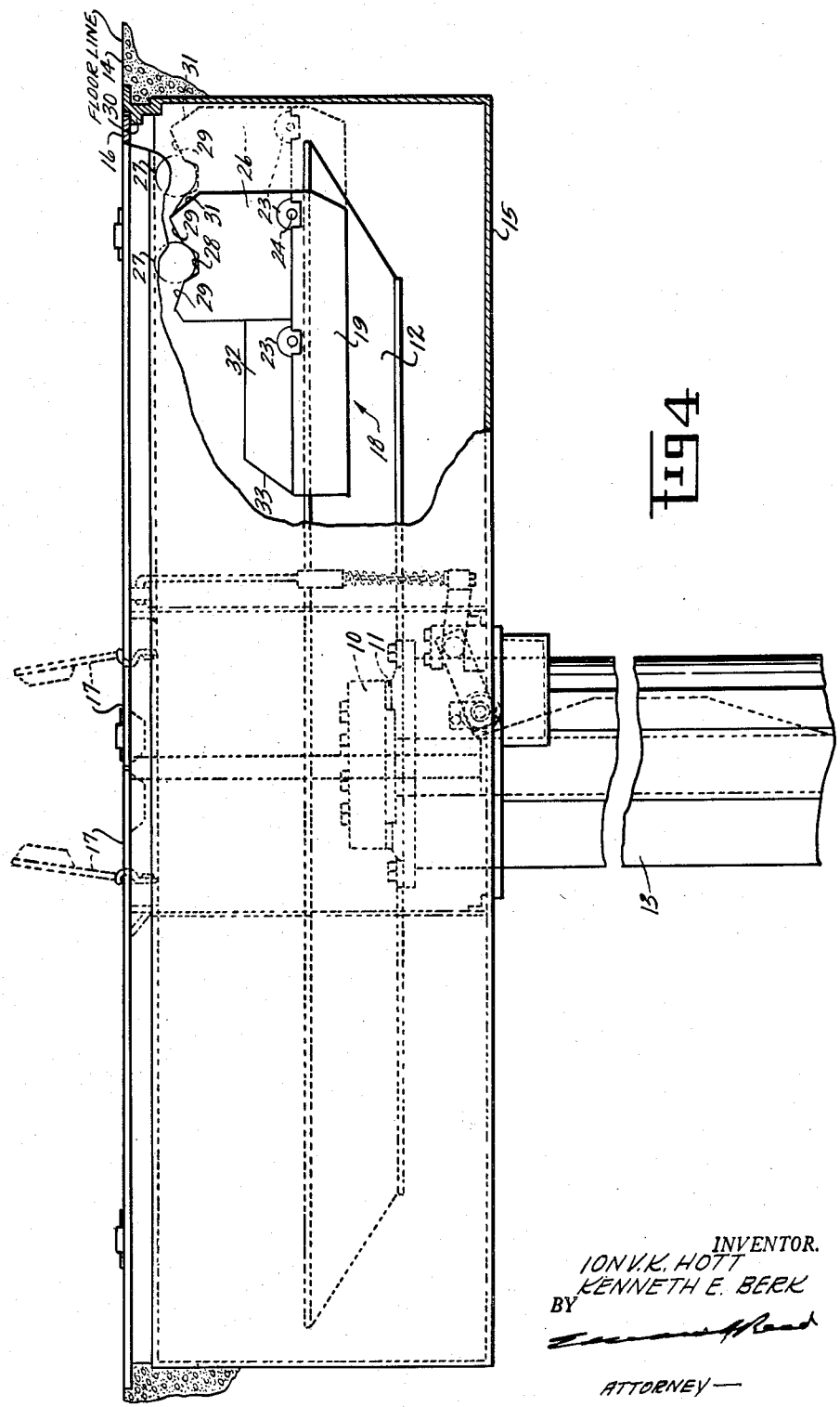

Sept. 28, 1954     I. V. K. HOTT ET AL     2,690,235
ADJUSTABLE AXLE SUPPORT FOR AUTOMOBILE LIFTS
Filed March 20, 1950     3 Sheets-Sheet 3
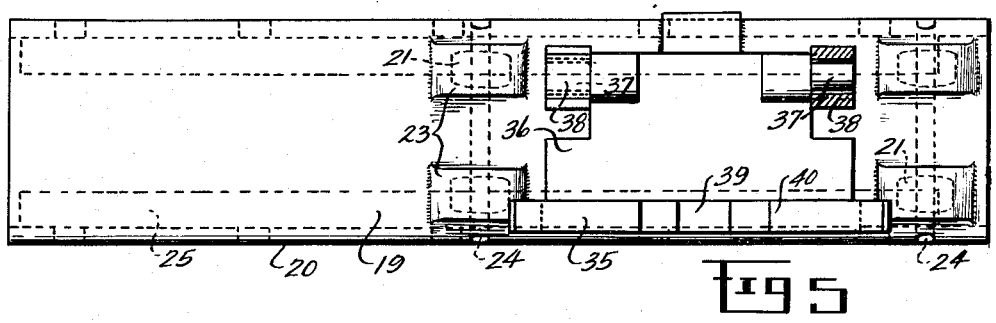
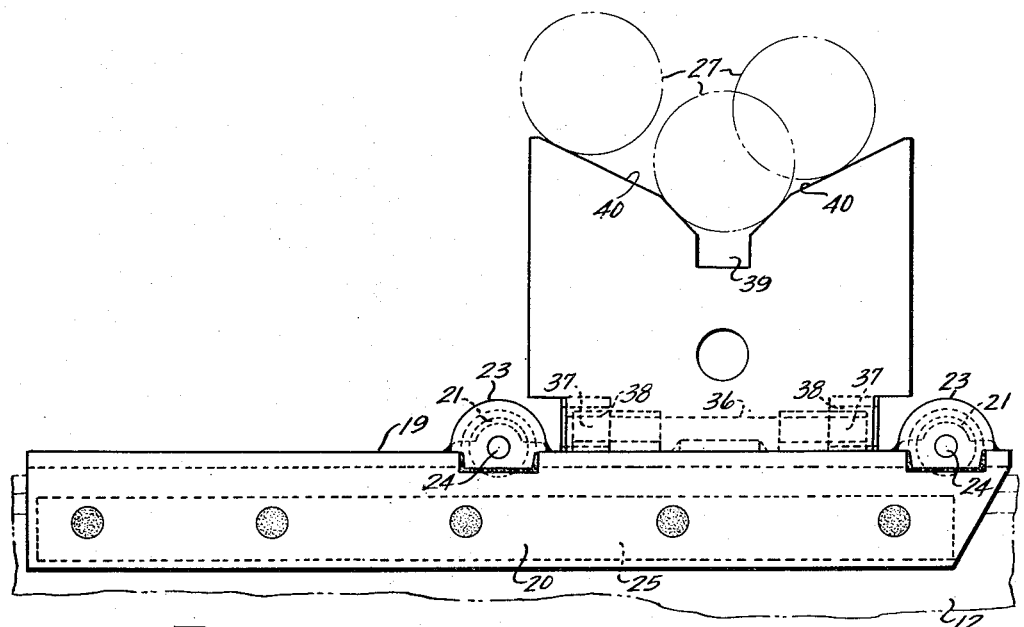
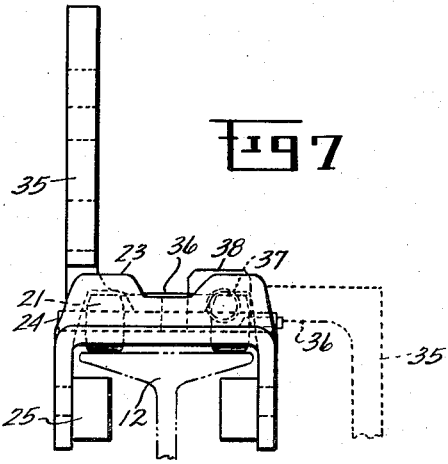
INVENTOR.
ION V. K. HOTT
KENNETH E. BERK
BY
ATTORNEY Patented Sept. 28, 1954

2,690,235

UNITED STATES PATENT OFFICE 2,690,235

ADJUSTABLE AXLE SUPPORT FOR AUTOMOBILE LIFTS

Ion V. K. Hott and Kenneth E. Berk, Dayton, Ohio, assignors to The Joyce-Cridland Company, Dayton, Ohio, a corporation of Ohio Application March 20, 1950, Serial No. 150,697

3 Claims. (Cl. 187—8.75)

1

This invention relates to an adjustable axle support for an automobile lift and is designed primarily for use on the rear superstructure of a two post lift.

As is well known, a two post lift comprises front and rear lifting mechanisms which are controlled by the same control mechanism. When an automobile is driven onto such a lift the front axle is placed directly above the lifting element of the front lifting mechanism and, in order to accommodate automobiles having wheel bases of different lengths, the rear lifting mechanism is provided with parallel rails of substantial length extending forwardly and rearwardly from the rear lifting element. It is desirable to provide these rails with axle supporting members which can be moved lengthwise of the rails to position the same below and in line with the rear axle of an automobile which has been positioned above the lift.

One object of the invention is to provide such an axle support which can be quickly and accurately adjusted to a position below the axle of an automobile positioned above the lift.

A further object of the invention is to provide such an axle support which will be automatically adjusted to correct any minor inaccuracy in the initial adjustment thereof.

In some installations the rails of the lifting mechanism, when in their lowered positions, are enclosed in a pit below floor level, and a further object of the invention is to provide an axle support which, in the event it is inadvertently moved to a position in line with and below an obstruction in the pit, will be automatically moved to a position in which it will clear that obstruction.

A further object of the invention is to provide an adjustable axle support which can be folded to a position on the rail such that, when applied to a lift of the type in which the rails are above the ground when in their lowered positions, no part of the support will extend a material distance above the rail.

Other objects of the invention may appear as the mechanism is described in detail.

In the accompanying drawings Fig. 1 is a perspective view of the rear superstructure of a two post lift having axle supports mounted thereon; Fig. 2 is a side elevational view of one of the axle supports; Fig. 3 is a sectional view taken on the line 3—3 of Fig. 2; Fig. 4 is a side elevation of a pit housing, partly broken away to show the superstructure and axle supports therein; Fig. 5 is a top plan view of a modified form of the axle support; Fig. 6 is a side elevational view of

2 the support of Fig. 5; and Fig. 7 is an end elevational view of the support of Fig. 5.

In these drawings we have illustrated a preferred embodiment of the invention together with a minor modification thereof, but it is to be understood that the support may take various forms and may be applied to lifting mechanisms of various kinds without departing from the spirit of the invention.

In the construction shown in Fig. 1 the rear superstructure comprises a cross member 10 rigidly mounted upon the upper end of the lifting element 11 of a lifting mechanism, and parallel rails 12 rigidly secured to the respective ends of the cross member. The rails may be of any suitable character but as here shown they are formed of I-beams so that the heads of the rails are T-shape in cross section. Fig. 4 shows the lifting element 11 mounted in the cylinder 13 of a hydraulic lift, said cylinder being mounted below, and extending into, a pit which is below the level of the floor 14. The pit is here shown as comprising a sheet metal housing 15 embedded in concrete and is provided with side doors to close those portions of the pit opening through which the rails move, one of these side doors being shown at 16, and with transverse doors 17 to close the pit above the cross member 10 in a known manner, when the superstructure is in its lowered position. In this figure one of the axle supports 18 is shown as mounted on the rail 12 adjacent one end thereof which, in the present instance, is the forward end thereof with relation to the automobile.

An axle support is provided for each rail and in the construction here illustrated each axle support comprises a base 19 which is of a width approximating, but slightly greater than, the width of the head of the rail 12 and is in the form of a channel having side members, or flanges, 20 extending downwardly on opposite sides of the rail. The base is provided with rollers 21 by which it may be supported on the head of the rail 12 and in the arrangement shown that portion of the base above the rail is provided with laterally spaced cavities 22 to receive the rollers 21. Preferably the top wall above the cavities is extended upwardly so as to provide closed wheel housings 23. A pintle, or shaft, 24 is mounted in the upright side members 20 and in that portion of the top wall of the base which lies between the cavities 22, the rollers being thus positioned adjacent the respective sides of the head of the rail. The downwardly extending portions, or flanges, of the base are spaced one from the other distances slightly greater than the width of the rail head to provide ample clearance therefor but to prevent any material lateral displacement of the base with relation to the rail. The lower portions of the flanges 20 of the base are provided with parts extending inwardly therefrom beneath the respective flanges of the rail head and spaced therefrom distances sufficient to provide ample clearance between the same and the rail but to limit the upward movement of the base with relation to the rail. These inwardly extending parts may be of any suitable character and are here shown as longitudinal bars 25 rigidly secured to the respective flanges. The base is supported on a plurality of pairs of rollers spaced apart lengthwise thereof. In the present arrangement there are two pairs of rollers, one pair being arranged close to the forward end of the base and the second pair being arranged at an intermediate point between the ends of the base and preferably midway between those ends.

Mounted on the base adjacent one side thereof is an upright member, or plate, 26 which may be secured to the base in any suitable manner and is shown in Figs. 2 and 3 as being welded thereto. The upright member, or plate, 26 is of a thickness sufficient to provide it with ample strength and is shown as generally rectangular in form. It is provided in its upper portion with a seat to receive the housing of the rear axle, diagrammatically indicated at 27 in Fig. 2. This seat is here shown as a recess 28 in the upper edge of the plate, preferably approximately midway between the front and rear edges thereof. Those portions of the upper edge of the plate which are in front of and in the rear of the seat 28 are inclined inwardly and downwardly as shown at 29, so that if the support is slightly off-center with relation to the axle housing one or the other of the inclined surfaces 29 of the support will engage the axle housing as the support moves upwardly and the support will be moved lengthwise of the rail until the axle housing enters the seat 28.

The upper edges of the pit are protected by angle bars 30, the upper flange of each bar being embedded in concrete and the other flange being arranged in the upper portion of the pit and being usually thickened to provide support for the doors. As will be noted in Fig. 4, the rails extend for substantially the full length of the pit, the ends of the rails being spaced only a slight distance from the end walls of the pit housing 15. This distance is such that the axle support can be moved forwardly far enough to disengage the front rollers 21 from the track and it is possible for the support to be inadvertently moved forwardly far enough to bring the forward edge of the support into line with and below the inwardly projecting part of the adjacent angle bar 30. Should a support having a straight front edge be in such a position when upward movement is imparted to the superstructure the upper forward corner of the support would engage the projecting part of the angle bar and might cause serious damage as by the tearing the angle bar loose from the concrete or by damaging the axle support. To avoid this possibility means are provided for automatically moving the support rearwardly to a position in which it will clear such an obstruction. As here shown this is accomplished by cutting away the upper forward corner of the plate 26 to provide the same with an upwardly and rearwardly inclined surface 31, the upper rear end of that surface being spaced from the front vertical edge of the plate such a distance that it will clear an obstruction with which said vertical edge may be in line. Thus a continued upward movement of the superstructure will force the axle support rearwardly. The axle supports are not adjusted to axle supporting positions until the rails have moved above floor level and therefore the rearward movement of a support to clear an obstruction has no effect on the subsequent adjustment thereof.

When the rail heads have moved above floor level but the axle suports are still spaced a substantial distance from the axle housing the movement of the lift is interrupted and the supports are adjusted on the rails to position the same beneath the axle, usually by inserting a rod beneath the automobile and successively engaging the same with the supports and pushing or pulling the latter to the desired positions. The rails of the illustrated lift are of such length that each support can be positioned beneath the rear axles of nearly all automobiles, the wheel bases of which differ greatly in length, and when so positioned both pairs of rollers of both supports will be on the rails. However, there exist some automobiles having exceptionally short wheel bases and the supports can be brought into supporting relation to the rear axle of such an automobile only by moving the front pairs of rollers of the axle supports beyond the front ends of the rails. When the supports are so positioned the rear pairs of rollers will be on the rails and the inwardly extending members 25 on the bases of the supports will engage the lower surfaces of the rail heads so as to prevent any substantial tilting of the supports, and the bases of the supports are of ample strength to carry the load when the end portions thereof extend beyond the rails in this maner. By placing the upright plate 26 just in advance of the rear rollers and extending the base rearwardly beyond the rear rollers the load on the supports may be thus supported without danger of the supports moving off the rail heads.

The upright portion of each support also includes a rearwardly extending portion 32 which preferably is of a height materially less than the height of the forward portion 26 thereof. These two upright portions are rigidly connected one with the other either by forming the same in one piece or by welding the two portions one to the other. The two parts of the upright portions of each support are of such relative heights that if one of the supports is improperly positioned, so that the member 26 thereof is in front of and does not engage the axle housing, or that housing slips off the rear edge thereof, the axle housing will engage the lower rear member 32 of that support which will interrupt the tilting movement of the automobile before the automobile has reached an inclination which would cause it to slide laterally on the supports. Inasmuch as it is also possible for the support to move rearwardly to a position in which this rear portion of the upright structure could engage an obstruction at the rear end of the pit, the rear edge of the part 32 has been inclined upwardly and forwardly as shown at 33 so that its contact with such an obstruction will move the support forwardly to a position in which it will clear the obstruction.

An axle support of this general type is also desirable on that type of lift in which the superstructure does not enter a pit but, when in its lowered position, rests upon the surface of the floor or ground. However, in such a lift it is undesirable that the upright portions of the supports should extend materially above the rails of the superstructure when the latter is not in use. We have, therefore, provided a modified form of the axle support in which the upright load engaging member is pivotally mounted on the base in such a manner that when not in use it can be folded downwardly to a position in which it does not extend materially above the base. As shown in Figs. 5, 6 and 7 this form of the support comprises a base and a member, or plate, 35 having secured thereto a second member, or plate, 36 which is pivotally mounted at that edge remote from the member 35 on the base for movement about an axis extending lengthwise of the base. This axis is so arranged with relation to the lateral edges of the base that when the member 36 is moved to a position above and transverse to the base the engaging member 35 will be in an upright position and the transverse member 36 will rest upon the top of the base to provide a rigid support for the member 35. When the pivotal structure is swung outwardly about its axis, through an arc of approximately 180°, it will extend outwardly beyond the base in a substantially horizontal position and the part 35 will be in a downwardly extending position, the vertical width of the part 35 with relation to the height of the rails being such that it can be moved to this position without engaging the ground or floor. The base is of substantially the same construction as that shown in Figs. 1 to 3 and the parts thereof bear the same reference numerals. The plate 36 may be pivotally mounted on the base in any suitable manner, as by a pivot pin, or pintle, 37, mounted in bearings 38 on the base. That edge of the member 35 which is upright when the support is in its operative position, is provided with a seat 39 and with inclined edge portions 40 similar to those shown in Figs. 1, 2 and 3.

While we have shown and described certain embodiments of our invention, we wish it to be understood that we do not desire to be limited to the details thereof as various modifications may occur to a person skilled in the art.

Having fully shown and described our invention, what we claim as new and desire to secure by Letters Patent, is:

1. In an axle supporting device for an automobile lift of the type comprising a pair of vehicle I-beam supporting rails adapted to be submerged in a pit, the length of the rails approximating the length of the bit, said axle supporting device including a pair of bases, one for each rail, each base having means whereby it may be supported on one of its rails for movement lengthwise thereof, two pairs of rollers positioned between the base and the top surface of the flange of the rail, one pair of rollers being located adjacent one end of the base, the other pair of rollers being located near the center of the base, a load-supporting member mounted upon the base near the rollers, said base having oppositely disposed downwardly projecting flanges, a pair of longitudinally extending bars secured to the downwardly projecting flanges and underlying the upper flange of the I-beam so as to hold the base upon the rail and permit the portion of the base underlying the load-supporting member to project beyond the rail so as to support a load extending beyond the length of the rails and beyond the length of the pit.

2. In an axle supporting device according to claim 1, wherein the main body of the base is provided with upwardly directed roller housings forming cavities in the underside for the rollers.

3. In an axle supporting device for an automobile lift of the type comprising a pair of vehicle beams having lateral flanges, said beams constituting rails, said axle supporting device including a pair of bases, one for each of the rails, each base including a plate member overlying its base, a pair of rollers journalled near one end of the plate member for supporting the plate member upon the rail, another pair of rollers journalled near the lengthwise center of the base, a load supporting member attached to the base and projecting upwardly between the two pairs of rollers, said plate member including a pair of downwardly laterally disposed flanges extending parallel to the lateral flanges of the beam, and projecting below the same, each of the downwardly projecting flanges having a longitudinally extending bar attached thereto and underlying the flanges of the beam so that the axle load supporting device may function as a cantilever support projecting beyond the end of the rail, in which event the longitudinally extending bars engage the underside of the overlying flanges to support the axle located beyond the end of the rail.

References Cited in the file of this patent

UNITED STATES PATENTS

| Number | Name | Date |
|---|---|---|
| 1,948,367 | Bristol | Feb. 20, 1934 |
| 2,443,405 | Thompson | June 15, 1948 |
| 2,458,986 | Frey | Jan. 11, 1949 |
| 2,508,777 | Smith | May 23, 1950 |
| 2,517,789 | Hott et al. | Aug. 8, 1950 |
| 2,577,375 | Snider | Dec. 4, 1951 |